United States Patent
Moisanen et al.

(10) Patent No.: US 8,412,190 B1
(45) Date of Patent: Apr. 2, 2013

(54) APPARATUS AND METHOD FOR WIRELESS DEVICE

(75) Inventors: Matti Moisanen, Oulu (FI); Heikkinen Samuli, Oulu (FI)

(73) Assignee: Renesas Mobile Corporation, Tokyo (JP)

( * ) Notice: Subject to any disclaimer, the term of this patent is extended or adjusted under 35 U.S.C. 154(b) by 0 days.

(21) Appl. No.: 13/298,826

(22) Filed: Nov. 17, 2011

(30) Foreign Application Priority Data

Nov. 15, 2011 (GB) ................................ 1119708.4

(51) Int. Cl.
*H04W 4/00* (2009.01)

(52) U.S. Cl. ...................... 455/434; 455/436; 455/435.3; 370/216; 370/338

(58) Field of Classification Search ............... 455/456.1, 455/454, 403, 450, 461, 437, 434, 436, 435.3, 455/435.2; 370/333, 332, 347, 330, 216, 370/338, 328; 398/63, 51, 71; 725/144
See application file for complete search history.

(56) References Cited

U.S. PATENT DOCUMENTS

| | | | | |
|---|---|---|---|---|
| 2004/0038681 | A1* | 2/2004 | Chun | 455/436 |
| 2009/0149180 | A1* | 6/2009 | Kitazoe | 455/436 |
| 2010/0189083 | A1* | 7/2010 | Lee et al. | 370/338 |
| 2011/0034169 | A1* | 2/2011 | Roberts et al. | 455/435.3 |
| 2011/0064052 | A1* | 3/2011 | Lee | 370/331 |
| 2011/0080825 | A1* | 4/2011 | Dimou et al. | 370/216 |
| 2011/0268023 | A1* | 11/2011 | Srinivasan et al. | 370/328 |
| 2011/0294508 | A1* | 12/2011 | Min et al. | 455/436 |
| 2011/0305192 | A1* | 12/2011 | Faccin et al. | 370/328 |
| 2012/0071163 | A1* | 3/2012 | Klingenbrunn et al. | 455/435.2 |

FOREIGN PATENT DOCUMENTS

JP 2011239032 A * 11/2011
WO WO 2011/119862 A1 9/2011

OTHER PUBLICATIONS

TD S2-100322, 3GPP TSG SA WG2 Meeting #77, Jan. 18-22, 2010, Shenzhen, China, Samsung, "Re-enabling E-UTRAN Capability for Voice Centric UEs", (2 pages).
ETSI TS 123 272 V9.3.0 (Mar. 2010), Technical Specification, Digital Cellular Telecommunications System (Phase 2+); Universal Mobile Telecommunications System (UMTS); LTE; Circuit Switched (CS) Fallback in Evolved Packet System (EPS); Stage 2 (3GPP TS 23.272 version 9.3.0 Release 9), (67 pages).

* cited by examiner

*Primary Examiner* — Mahendra Patel
(74) *Attorney, Agent, or Firm* — Harrington & Smith

(57) ABSTRACT

A wireless device is arranged to switch the radio access technology it is using. The wireless device disconnects from using a first radio access technology and at least attempts to connect to use a second radio access technology. It is determined that the wireless device should revert to using the first radio access technology. At expiry of a predetermined period of time after the determining, the wireless device is caused to cease using or attempting to use the second radio access technology and to revert to using the first radio access technology.

12 Claims, 3 Drawing Sheets

APPARATUS AND METHOD FOR WIRELESS DEVICE

CROSS REFERENCE TO RELATED APPLICATION

This application claims benefit under 35 U.S.C. §119(a) and 37 CFR 1.55 to UK patent application no. 1119708.4, filed on Nov. 15, 2011, the entire content of which is hereby incorporated by reference.

TECHNICAL FIELD

The present invention relates to apparatus for a wireless device and a method of switching network connection of a wireless device.

BACKGROUND

The following abbreviations are used in the present specification:

| | |
|---|---|
| 3GPP | Third Generation Partnership Project |
| CS | Circuit Switched |
| EDGE | Enhanced Data Rates for GSM Evolution |
| EUTRAN | evolved UMTS Terrestrial Radio Access Network |
| eNB | Evolved Node B |
| GSM | Global System for Mobile Communications |
| LTE | Long Term Evolution |
| MME | Mobility Management Entity |
| PLMN | Public Land Mobile Network |
| RAT | Radio Access Technology |
| RF | Radio Frequency |
| SMS | Short Messaging Service |
| TAI | Tracking Area Identity |
| UMTS | Universal Mobile Telecommunications System |
| USIM | Universal Subscriber Identity Module |
| USSD | Unstructured Supplementary Service Data |

In general, a wireless device on a first network may be using a first radio access technology but may need to switch to using a second, different radio access technology in order to access different services that are offered by that second radio access technology and not by the first radio access technology. The first and second radio access technologies may in general be provided by the same or equivalent networks or by different networks. However, once the device has reconnected to using that second radio access technology, there may not be a quick or effective way for the device to return to using the first radio access technology.

As a particular example, some mobile device services, such as voice calls and their associated supplementary services (e.g. call waiting and call forwarding services), USSD (Unstructured Supplementary Service Data) services and SMS (Short Messaging Services)), can only be achieved by using circuit switched technologies, at least in some applications or cases. However, in a particular case, radio access technologies (RATs) according to LTE (Long Term Evolution) standards do not comprise circuit switched technologies; LTE RATs are based entirely on packet switched technologies. Thus, in order to provide circuit switched services to devices using LTE RATs, such as EUTRAN, the devices must undergo a circuit switched (CS) fallback procedure, which reconnects the device to a "legacy" or other RAT that does support CS services. Such RATs include those using for example GSM (Global System for Mobile Communications), EDGE (Enhanced Data Rates for GSM Evolution) and UMTS (Universal Mobile Telecommunications System).

Currently, LTE RATs are the only RATs that do not support circuit switched services. However in the future there may be other RATs developed that also do not support these services, and devices using these RATs would also need to reselect a different RAT to use CS services.

Once the CS service has been completed, the wireless device may be able to use normal cell reselection procedures to reselect the original LTE RAT. However, this is only the case if the wireless device is connected to the same (or "equivalent") PLMN (Public Land Mobile Network) when using both the legacy and the LTE RATs, and in any event this can be a slow process, depending on for example signal strength and cell reselection parameters, which causes delays for the user. "Equivalent" PLMNs in this context are defined by 3GPP and discussed in more detail below, but for the moment, this can be summarised in that if a first PLMN is "equivalent" to a second PLMN, then a wireless device will treat both PLMNs as if they were the same.

Moreover, if a device has had to connect to a different PLMN as a result of the CS fallback procedure, there is currently no standard procedure to quickly reconnect the wireless device to its original PLMN. In theory, inter-PLMN redirection could take place, but this requires that the new PLMN know at least some information about the current PLMN so that the new PLMN can send a redirection command to the device. However, this requires cooperation between the current and new PLMNs, which in practice is unlikely to occur. Separately, in general, wireless devices undergo periodic so-called higher priority searches. The device has stored a list of PLMNs stored in a memory of the wireless device. These PLMNs are ranked in priority order, and the device will try to connect to the highest priority PLMN if it finds that it is not already connected to that PLMN. However, higher priority searches are typically infrequent, and, as such, the wireless device could remain connected to the legacy PLMN for a relatively long time, perhaps on the order of several minutes to 8 hours or more.

SUMMARY

In a first exemplary embodiment of the invention, there is a method of switching radio access technology used by a wireless device, the method comprising: causing the wireless device to disconnect from using a first radio access technology and to at least attempt to connect to use a second radio access technology; determining that the wireless device should revert to using the first radio access technology; and, at expiry of a predetermined period of time after the determining, causing the wireless device to cease using or attempting to use the second radio access technology and to revert to using the first radio access technology.

In a second exemplary embodiment of the invention, there is apparatus for a wireless device, the apparatus comprising; at least one processor; and at least one memory including computer program code; the at least one memory and the computer program code being configured to, with the at least one processor, cause the apparatus at least to: cause the wireless device to disconnect from using a first radio access technology and to at least attempt to connect to use a second radio access technology; determine that the wireless device should revert to using the first radio access technology; and, at expiry of a predetermined period of time after the determining, cause the wireless device to cease using or attempting to use the second radio access technology and to revert to using the first radio access technology.

There may also be provided a wireless device comprising apparatus as described above.

There may also be provided a computer program comprising code such that when the computer program is executed on a computing device, the computing device is arranged to carry out a method as described above. There may also be provided a non-transitory computer-readable storage medium comprising a set of computer-readable instructions stored thereon, which, when executed by a processing system, cause the processing system to carry out a method as described above.

Further features and advantages of the invention will become apparent from the following description of preferred embodiments of the invention, given by way of example only, which is made with reference to the accompanying drawings.

DETAILED DESCRIPTION

Figure 1:
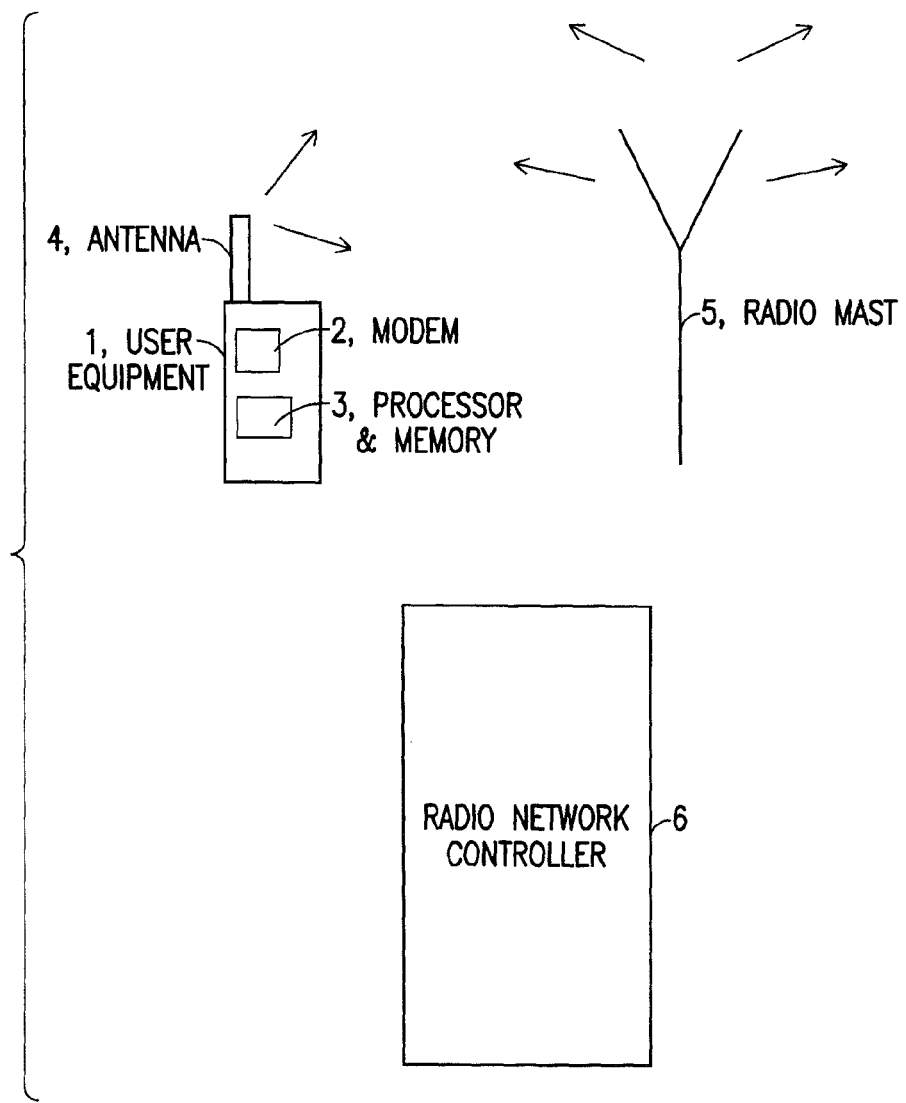
FIG. 1 shows a block diagram illustrating schematically an example of a wireless device and a wireless network.

The first radio access technology will, in general, support different services from the second radio access technology. Often a wireless device will need to use a second radio access technology for a short time, in order to obtain or provide services that are supported by the second radio access technology, but are not supported by the first radio access technology. However, it will often be the case that overall, the services provided by the first radio access technology are preferable to those provided by the second radio access technology. As such, it is useful for the wireless device to revert to using the first radio access technology, and to do so promptly when desired. For example, it may be that the first radio access technology does not provide circuit switched services (as in the case of LTE network technology for example), so the device switches to the second radio access technology which does provide a circuit switched service (as in the case of GSM network technology for example). However, it may be that the first radio access technology supports a higher level of data services than the second radio access technology, or is less expensive for the user (perhaps because of different price plans, etc.). Thus, in this case, reverting back to the first radio access technology once the circuit switched service has been completed will, in general, enable the wireless device to provide faster and/or cheaper data services than if it continued using the second radio access technology.

Additionally, waiting a predetermined period of time from when it was determined that the wireless device should revert to using the first radio access technology allows time for the wireless device to initiate any further services on the second radio access technology if they are required, and avoids having to repeatedly reselect between the first and second radio access technologies if multiple services are required on the second radio access technology. Alternatively, if the services provided by the first radio access technology are more important than those provided by the second radio access technology, then the predetermined period of time can be chosen to be zero, or close to zero, such that the device reverts back to using the first radio access technology as quickly as possible. If the timer is running but a new attempt to use the second radio access technology is initiated, then the timer can be stopped or ignored to allow that attempt to proceed.

In an embodiment, the wireless device is initially connected to a first network that provides the first radio access technology, and the second radio access technology is provided by a second network that is not the same as the first network and is not recorded in the wireless device as being equivalent to the first network.

In an embodiment, the wireless device is initially connected to a first network that provides the first radio access technology, and the second radio access technology is provided by the same first network or by a network that is recorded in the wireless device as being equivalent to the first network.

It is sometimes the case that, if a wireless device requires services offered by a second radio access technology, it will have to connect to a network that is different from the network used when using the first radio access technology, though it may be able to obtain those services from a second network that is the same as or equivalent to the first network. Thus, embodiments provide a method for reverting back to the first radio access technology for all cases where the second network is the same as or equivalent to the first network, or different from the first network.

In an embodiment, the wireless device reverts back to using the first radio access technology by reselecting a cell that uses the first radio access technology at expiry of the predetermined period of time. In an embodiment, the wireless device reverts back to using the first radio access technology by the wireless device carrying out a higher priority search of networks at expiry of the predetermined period of time. Cell reselection within the same or an equivalent network is a relatively straightforward process which can be carried out quickly in some cases. Separately, in many cases, the first network is likely to be the highest priority network as recorded by the wireless device, and thus the wireless device will usually be reconnected back to the first network by carrying out a higher priority search. Thus, in these embodiments, the wireless device will very likely be able to revert back quickly to using the first radio access technology on the first or an equivalent network. As such, roaming charges may be minimised or avoided, and, furthermore, particular examples of these embodiments avoid the need to store and retrieve information relating to the first network.

In an embodiment, information concerning the first network is stored before the wireless device disconnects from using the first radio access technology. In an embodiment, the information concerning the first network is stored in a memory of the wireless device. This allows the wireless device to identify which network it was connected to when it was initially using the first radio access technology. This in turn allows the wireless device to reconnect to the first network quickly and effectively, avoiding delays for the user, even in cases where cell reselection or higher priority searches are not possible or fail for any reason. In a particular embodiment discussed in more detail below, where a device has undergone CS fallback, it is often desirable for the device to reselect back to an LTE RAT soon after a CS service has been completed, because LTE RATs will generally offer higher levels of data services (i.e. faster data services) than legacy RATs. If the wireless device has had to connect to a visited PLMN to use a legacy RAT, it is often desirable to reconnect back with the original PLMN as soon as possible, because roaming on visited PLMNs can be expensive. This is more easily achieved with embodiments of the present invention. The memory may be a volatile type of memory but more preferably is some non-volatile storage device in the wireless device.

In an embodiment, the wireless device retrieves the information concerning the first network once it has been determined that the wireless device should revert to using the first radio access technology, the wireless device using the information to establish whether the network providing the second radio access technology is the same as or equivalent to the first network or different from the first network. This allows the wireless device to determine whether it needs to reconnect to a different network before it can revert to using the first radio access technology.

In an embodiment, the wireless device uses the stored information concerning the first network to reconnect back to the first network at expiry of the predetermined period of time. Again, this allows the wireless device to reconnect to the first network quickly and effectively, avoiding delays for the user, even in cases where cell reselection or higher priority searches are not possible or fail for any reason.

As an alternative to using stored information concerning the first network, it may be possible in some cases for the wireless device to revert to using the first radio access technology on a network that is identified on the basis of the geographical location of the wireless device. For example, the wireless device may know, or the network to which it is currently connected may inform the wireless device, that given the current geographical location of the wireless device, a particular network is providing the first radio access technology in that geographical area/network cell, and the wireless device may therefore decide to connect to that particular network. Thus, in an embodiment, the wireless device reverts back to using the first radio access technology by selecting a network, which provides the first radio access technology, on the basis of at least one of the geographical location of the wireless device and the topology of the network to which the wireless device is connected.

In an embodiment, the or each network providing the first and second radio access technologies is a public land mobile network, the first radio access technology uses LTE network technology, and the second radio access technology provides circuit switched services. The problems solved by embodiments of the present invention are a particular issue in use of LTE technology, as discussed further herein.

In an embodiment, the determining that the wireless device is to revert to using the first radio access technology is determined by the wireless device. This may be on the basis of one or more criteria, such as because the call or other attempted use of the second radio access technology failed for some reason, or the call or other use of the second radio access technology was completed, or registration with the second radio access technology failed, or data services are required on the wireless device which can only be provided by or are at least more optimally provided by the first radio access technology (for example because of higher data transfer rates and/or lower latency, or because the cost to the user is lower), or on receipt of an input from a user who decides that they want to use the first radio access technology.

"Wireless devices" include in general any device capable of connecting wirelessly to a network, and includes in particular mobile devices including mobile or cell phones (including so-called "smart phones"), personal digital assistants, pagers, tablet and laptop computers, content-consumption or generation devices (for music and/or video for example), data cards, USB dongles, etc., as well as fixed or more static devices, such as personal computers, game consoles and other generally static entertainment devices, various other domestic and non-domestic machines and devices, etc. The term "user equipment" is often used to refer to wireless devices in general, and particularly mobile wireless devices.

Wireless devices are connected to a wireless network. It will be understood that "network control apparatus" is the overall apparatus that provides for general management and control of such a network and the connected devices. Such apparatus may in practice be constituted by several discrete pieces of equipment. As a particular example in the context of UMTS (Universal Mobile Telecommunications System), the network control apparatus may be constituted by for example a so-called Radio Network Controller operating in conjunction with one or more Node Bs (which, in many respects, can be regarded as "base stations"). As another example, LTE (Long Term Evolution) makes use of a so-called Evolved Node B (eNB) where the RF transceiver and resource management/control functions are combined into a single entity. The term "base station" is used in this specification to include a "traditional" base station, a Node B, an evolved Node B (eNB), or any other access point to a network, unless the context requires otherwise.

FIG. 1 shows schematically a user equipment or wireless device, in this case in the form of a mobile phone/smartphone 1. The user equipment 1 contains the necessary radio system or modem 2, processor(s) and memory/memories 3, antenna 4, etc. to enable wireless communication with the network. The user equipment 1 in use is in communication with a radio mast 5. The radio mast 5 in the example illustrated is in the form of a Node B which is in communication with a Radio Network Controller 6.

Figure 2:
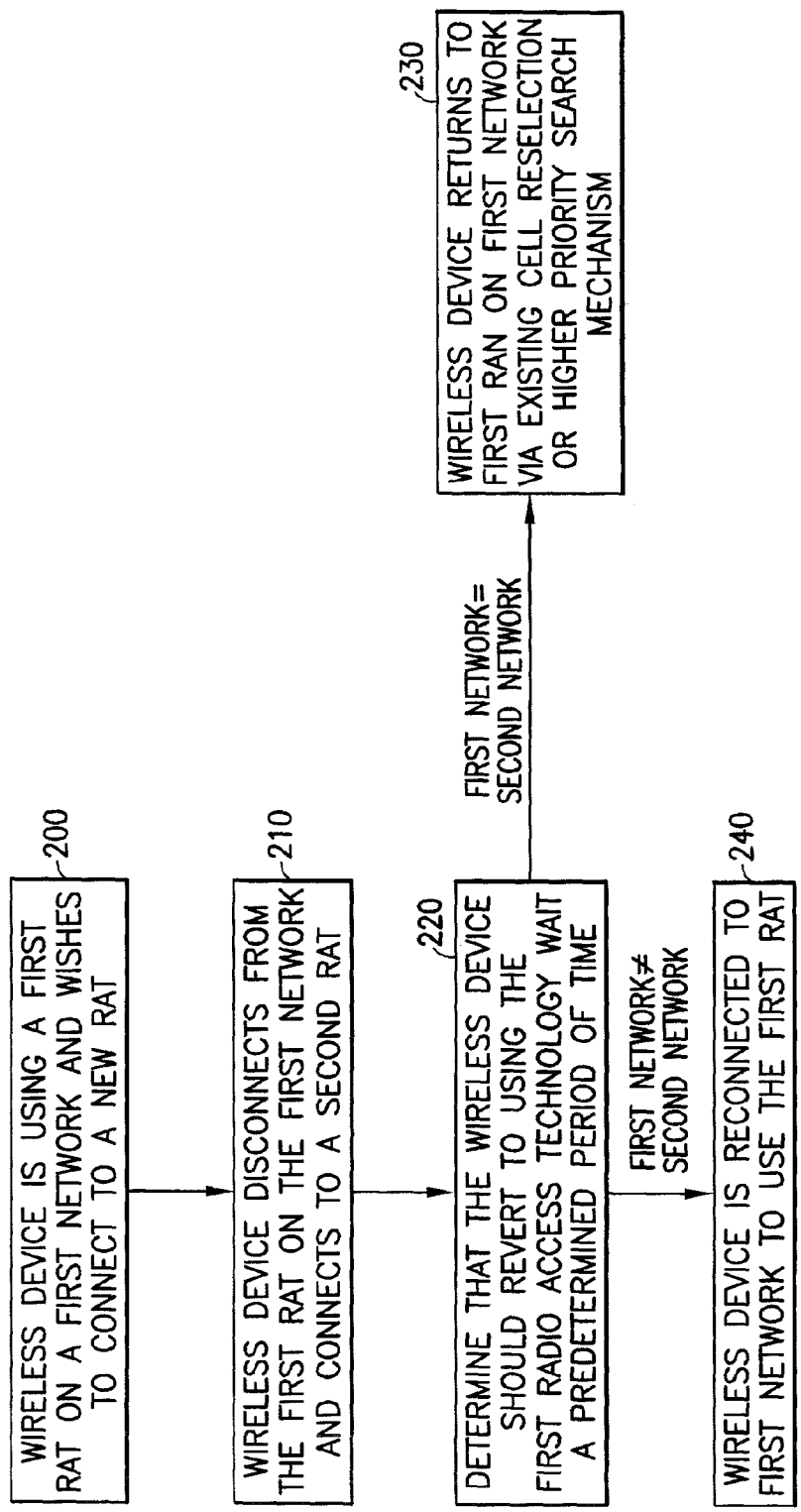
FIG. 2 shows a flowchart illustrating schematically an example of a method of reconnecting a wireless device back to a first RAT on a first network from a second RAT on a second network according to an embodiment of the present invention.

FIG. 2 shows schematically an example of an embodiment of the present invention in which a wireless device is initially using a first RAT on a first network and receives a trigger or otherwise decides to connect to a second, different RAT 200. The wireless device in a particular example has previously stored or caused to be stored information about the first network. The wireless device in an example reconnects from the first RAT on a first network to a second, different RAT 210 in order to obtain a service from the second RAT that is not available using the first RAT. In general, the second RAT may be provided by a network that is the same as or equivalent to the first network or by a second network that is different from the first network.

After the wireless device has connected to the second RAT 210, and has completed the desired activities using the second RAT or is otherwise ready to return to using the first RAT (perhaps because no connection could actually be made or the desired service could not be achieved on the second RAT, or a user has provided an input indicating that a return to using the first RAT is desired), then a processor of the wireless device determines that a return to using the first RAT is desired 220. As mentioned, information relating to the first network was preferably previously stored, for example by or at the instigation of the device, and this information is retrieved for the comparison with information about the second network. The information about the first network may have been stored in a volatile memory of the device, such as a RAM, a non-volatile memory of the device, such as a hard disk or a solid state drive or other non-volatile memory device, a USIM (universal subscriber identity module) of the device, or even externally of the device, such as in some storage within or connect to a network to which the device is connected.

If the first network is the same as (or in some cases "equivalent" to) the second network, then the wireless device can simply return to the first RAT via an existing cell reselection mechanism 230. If two networks are "equivalent", then a wireless device is able to seamlessly reselect between different RATs on the two networks. In other words, in a cellular case say, a wireless device will treat two equivalent networks as if they are the same for the purposes of network selection, cell selection/reselection and handover. A higher priority search mechanism can also be used in some circumstances. The wireless device may be configured to try the cell reselection mechanism or higher priority search mechanism first, and then try the other if that fails for example.

If the first and second networks are different (where "different" in this context means neither the same nor equivalent), then the processor may cause the wireless device to use a higher priority search mechanism, which in some cases will return the wireless device to the first network (or an equivalent network). As an alternative, the processor may cause the wireless device to reconnect to the first network using the information about the first network that was previously saved in a particular example. Again, these methods may be tried in one order or the other, with the other being tried if one fails. Once connected back to the same or an equivalent first network, the wireless device can then reselect a cell that uses the first RAT 240.

In all of these cases, after determining that the wireless device should revert to using the first radio access technology 220, the wireless device waits for expiry of a predetermined period of time before ceasing using or attempting to use the second radio access technology and reverting to using the first radio access technology. Thus, the wireless device never waits or has to wait longer than the predetermined period of time before reverting to using the first radio access technology, which is in contrast to some prior art arrangements in which reversion to using a first radio access technology happens at a time that is in essence random, and can be anything between minutes and hours or more. The predetermined period of time can be set to be as short or as long as is desirable. It may for example be desirable to return the wireless device to using the first radio access technology very quickly or even practically immediately so the predetermined period of time can be set to be very short, perhaps a few seconds or tens of seconds at most, or even zero. Slightly longer periods of time may be desirable to allow a further use of the second radio access technology to take place shortly after the first or a previous use of the second radio access technology, without the device returning to using the first radio access technology and having to go through the process of disconnecting from that and reconnecting to use the second radio access technology (which can be time-consuming). Moreover, if the timer is running and a new attempt to use the second radio access technology is initiated, then the timer is stopped to allow that attempt to proceed.

The overall processes as described above therefore provide methods for quickly reconnecting a wireless device back to using a first RAT from using a second RAT, when the wireless device was previously triggered to reconnect from using that first RAT to using that second RAT at an earlier time. The first RAT and second RAT may be provided by the same or equivalent networks or by different first and second networks respectively. In preferred embodiments, information about the first network, to which the wireless device was initially connected to use the first RAT, is stored, for example locally by the device, which is particularly useful for allowing for quick return to using the first network if the second network is different.

In a particular embodiment of the present invention, the first RAT is based on the Long Term Evolution (LTE) specification, and the or each network is a public land mobile network (PLMN). LTE specifications do not support circuit switched (CS) technologies, and thus services that require CS technologies cannot be achieved when a device is using an LTE RAT. CS services include for this purpose voice calls and their associated supplementary services (i.e. a call waiting or call forwarding service), USSD (Unstructured Supplementary Service Data) services and SMSs (Short Messaging Services).

As outlined by 3GPP specifications, if a wireless device needs to initiate a CS service whilst using an LTE RAT, the device will undergo a CS fallback procedure, which causes the device to reselect a cell that supports CS services (and thus uses a different RAT). Ideally this reselection will occur within the same (or "equivalent") PLMN, but sometimes a legacy RAT cannot be found within the original PLMN, and the device will have to reconnect to a "different" PLMN. PLMNs that are "equivalent" to a first PLMN are, in this case, defined by a list sent by the first PLMN when the device registers with that PLMN and stored in memory by the device. Equivalent PLMNs will have different codes, making them distinct, but they will be regarded by the device as the same PLMN for the purposes of PLMN selection, cell selection/reselection and handover, and, as such, a device will be able to move seamlessly between different RATs on equivalent PLMNs. "Different" PLMNs will thus be taken in this context to mean PLMNs that are neither the same nor equivalent.

In one example, a device may have to connect to a different PLMN in order to carry out a CS fallback procedure, because the device cannot find any cells that support CS services within its current PLMN and it also cannot find any such cells within any equivalent PLMNs. As a particular example, the device may not be able to find any such cells because all the cells in the local area of the device that are part of the device's current PLMN only use LTE RATs. On the other hand, in some cases, it may be that the device's current PLMN, or an equivalent PLMN, does provide the desired legacy service that provides CS services.

RATs that support CS services will be referred to herein as "legacy RATs" and these legacy RATs will, in general, be based on pre-LTE specifications. Such specifications include for example UMTS, EDGE, GPRS and GSM.

For ease of understanding, further embodiments described herein will refer to this specific example in which the first RAT is an LTE RAT and the second RAT is a legacy RAT, which may be provided by the same or equivalent network or by different networks, which in each case are PLMNs. It will be understood, however, that the following embodiments do not apply exclusively to these examples, and in general the same principles can be applied to cases where the first RAT is based on a non-LTE specification that also does not support CS services, and more generally to cases where a device is connected from a first RAT on a first network to a second RAT on the same or a second, different network and then back to the first RAT for any reason, including in particular to be able to use a service provided by the second RAT that is not provided by the first RAT.

Figure 3:
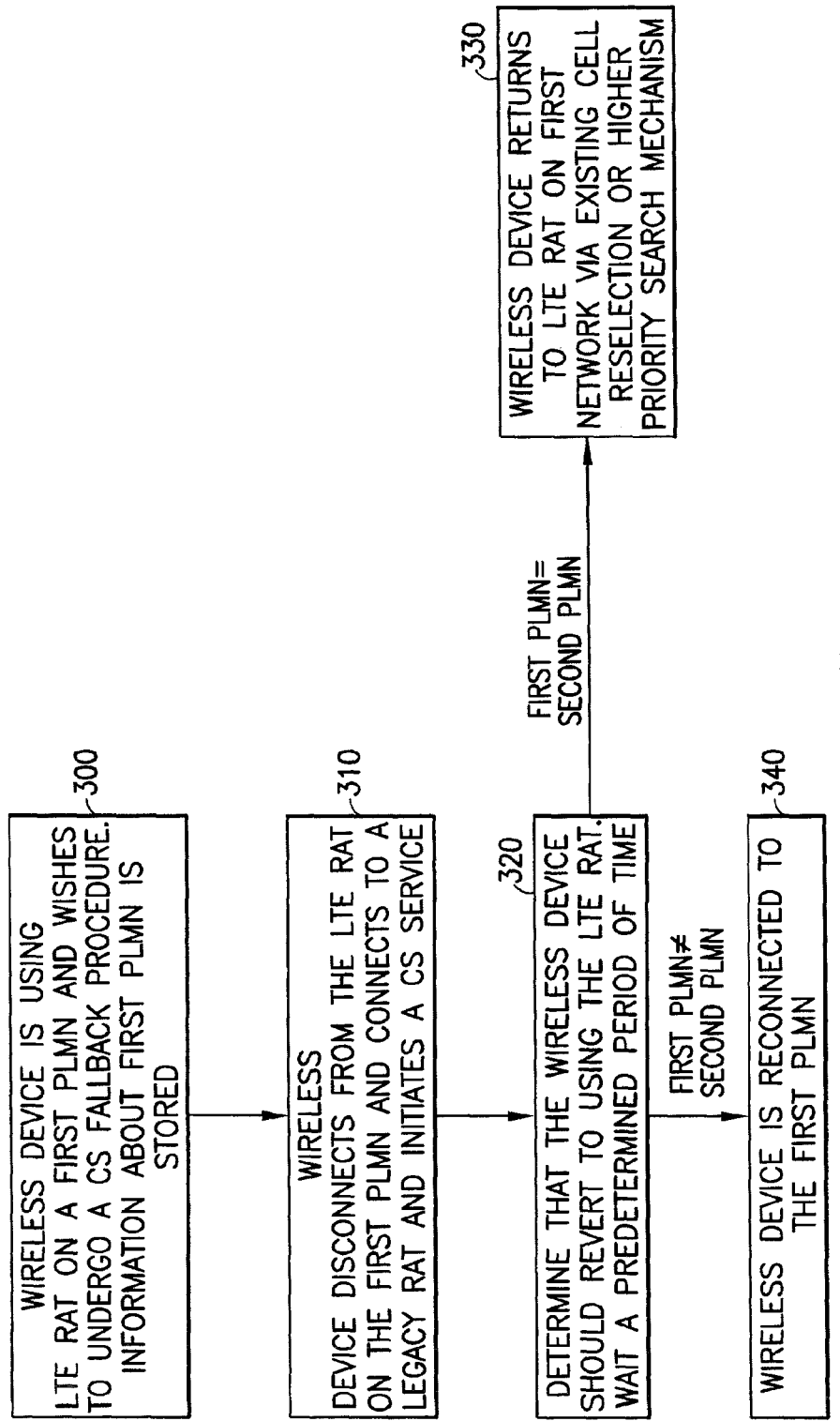
FIG. 3 shows a flowchart illustrating schematically another example of a method of reconnecting a wireless device back to a first RAT on a first network from a second RAT on a second network according to an embodiment of the present invention.

FIG. 3 shows schematically an example of an embodiment of the present invention, wherein, whilst connected to an LTE RAT on a first PLMN, a wireless device receives a trigger or otherwise decides to undergo a CS fallback procedure, so that the device can subsequently undertake or at least attempt to initiate one or more CS services 300. This may be because for example the user wishes to make a voice call. In accordance with one embodiment, information relating to the first PLMN is stored so that it can later be retrieved for later use. The information about the first PLMN can be stored locally in some local storage of the wireless device, such as in a volatile memory of the wireless device, such as a RAM, a non-volatile memory of the wireless device, such as a hard disk or a solid state drive or other non-volatile memory wireless device, a USIM (universal subscriber identity module) of the wireless device, etc., or even externally of the wireless device, such as some storage within a network to which the wireless device is connected. This storing of the information may be carried out or instigated by the wireless device, either always as a matter of course or perhaps when about to undertake the CS fallback procedure. The wireless device then carries out the CS fallback procedure, causing the wireless device to disconnect from the LTE RAT and reselect a legacy RAT, on the same or equivalent network or on a second PLMN 310. Once the reconnection to the legacy RAT is complete, the device begins initiating a CS service.

After the wireless device has connected to the legacy RAT 210, and has completed the desired activities using the legacy RAT (for example by finishing a voice call) or is otherwise ready to return to using the LTE RAT (perhaps because no connection could actually be made or the desired service could not be achieved on the legacy RAT, or a user has provided an input indicating that a return to using the LTE RAT is desired in any event), then a processor of the wireless device determines that a return to using the LTE RAT is desired 320. As mentioned, information relating to the first PLMN was preferably previously stored, for example by or at the instigation of the device, and this information is retrieved for the comparison with information about the second PLMN. The information about the first PLMN may have been stored in a volatile memory of the device, such as a RAM, a non-volatile memory of the device, such as a hard disk or a solid state drive or other non-volatile memory device, a USIM (universal subscriber identity module) of the device, or even externally of the device, such as in some storage within or connect to a network to which the device is connected. The information about the first and second PLMNs is retrieved from storage, and compared to establish whether the first PLMN is the same as (or equivalent to) the second PLMN. In general, a wireless device will have a list stored in a memory of the device comprising all PLMNs that are equivalent to a first PLMN.

If the first PLMN is the same as (or equivalent to) the second PLMN, then the wireless device can return to the LTE RAT via an existing cell reselection mechanism or higher priority search mechanism 330. The wireless device may be configured to try the cell reselection mechanism or higher priority search mechanism first, and then try the other if that fails for example.

If the first and second PLMNs are different (i.e. here, not the same nor equivalent), then the device is caused to use a higher priority search mechanism, which in some cases will return the wireless device to the first network (or an equivalent network). As an alternative, the processor may cause the wireless device to reconnect to the first PLMN using the information about the first PLMN that was previously stored in the preferred embodiment, and then to reselect a cell in the first PLMN that uses the LTE RAT 340. Again, these methods may be tried in one order or the other, with the other being tried if one fails.

In all of these cases, after determining that the wireless device should revert to using the LTE RAT 320, the wireless device waits for expiry of a predetermined period of time before ceasing using or attempting to use the legacy RAT and reverting to using the LTE RAT. Thus, the wireless device never waits or has to wait longer than the predetermined period of time before reverting to using LTE RAT, which is in contrast with the prior art arrangement discussed above in which reversion to using a LTE RAT happens at a time that is in essence random, and can be anything between minutes and 8 hours or so. The predetermined period of time can be set to be as short or as long as is desirable. It may for example be desirable to return the wireless device to using the legacy RAT very quickly or even practically immediately so the predetermined period of time can be set to be very short, perhaps a few seconds or tens of seconds at most, or even zero. Slightly longer periods of time may be desirable to allow a further use of the legacy RAT to take place shortly after the first or a previous use of the legacy RAT, without the device returning to using the legacy RAT and having to go through the process of disconnecting from that and reconnecting to use the legacy RAT (which can be time-consuming). As a particular example, a user may wish to make several voice calls in succession, so it may be desirable to leave the device connected to the legacy RAT for at least a few seconds and perhaps somewhere in the range 10 to 20 or 30 seconds or so in case further calls are to be made. In addition, if the timer is running and a new attempt to use the legacy RAT is initiated, then the timer is stopped to allow that attempt to proceed without an attempt to revert to the LTE RAT being made.

By triggering the return to using the LTE RAT after expiry of the predetermined period of time, the wireless device can return promptly and quickly to using the LTE RAT, avoiding the long delays that can arise under the current procedures discussed above. In embodiments, the use of the previously stored information about the original PLMN allows the wireless device to return particularly quickly to the first PLMN in the case that the first and second PLMNs are different. Returning quickly back to the LTE RAT and the first PLMN in particular is often desirable because the wireless device is likely to be roaming on the second PLMN and the associated roaming charges may be costly. Additionally, reconnecting back to the LTE RAT quickly is often desirable because, in general, LTE RATs offer higher qualities of data services than legacy RATs.

In one embodiment, the information about the first PLMN can be obtained from the tracking area identity or TAI held by the wireless device even when the wireless device has been connected to the second PLMN. The TAI may be stored in the USIM of some non-volatile memory of the device as part of the normal registration procedure when the wireless device registers with a network. However, there may be cases when the TAI is not available, for example if there was a registration failure during the CSFB procedure, which might require the wireless device to clear the TAI from the USIM. Thus, it is preferred that information about the first or original PLMN is specifically stored for later use as described. As mentioned, the information about the first PLMN can be stored locally in some local storage of the wireless device, such as in a volatile or preferably non-volatile memory or other storage device of the wireless device, or even externally of the wireless device, such as in some storage within or attached to a network to which the wireless device is connected.

In one example, if a timer is used, the expiry period of the timer may be set by the user. In another example, the expiry period of the timer may be determined by a processor of the wireless device according to one or a combination of: the USIM configuration, any broadcast system information and/or whether the device is data-centric or voice-centric. As a particular example, a device may be constructed and configured to deliver data services to a user at a high quality and rate and can be regarded as "data-centric". In this example, the device should in general return to an LTE RAT relatively quickly because connecting to an LTE RAT will enable the device to provide higher quality data services than when connected to a legacy RATs, and any timer value should be low (or even zero). As another example, a wireless device may be configured to provide a high quality of voice services to the user and can be regarded as "voice-centric". In this example voice services are more important than data services, and thus the timer value should be higher, say 10 seconds or more.

It may be the case that upon connecting to the second PLMN in order to carry out a CS service, the wireless device does not or is unable to successfully initiate any CS services. This may be the case if for example the user simply cancels the voice call attempt. As another example, access may be barred in a selected legacy cell and thus location registration cannot be completed, thus preventing the device from initiating a CS service even though the device is camping on the cell. As another example, it may be that the location registration in the second PLMN is completed, but the CS call cannot be initiated for some reason. These cases can still be regarded as "completion of the activity" in the second PLMN at step 320 above, leading to return to the first PLMN, possibly with a delay to see if a new CS service is initiated as discussed above.

Although at least some aspects of the embodiments described herein with reference to the drawings comprise computer processes performed in processing systems or processors, the invention also extends to computer programs, particularly computer programs on or in a carrier, adapted for putting the invention into practice. The program may be in the form of non-transitory source code, object code, a code intermediate source and object code such as in partially compiled form, or in any other non-transitory form suitable for use in the implementation of processes according to the invention. The carrier may be any entity or device capable of carrying the program. For example, the carrier may comprise a storage medium, such as a solid-state drive (SSD) or other semiconductor-based RAM; a ROM, for example a CD ROM or a semiconductor ROM; a magnetic recording medium, for example a floppy disk or hard disk; optical memory devices in general; etc.

It will be understood that the processor or processing system or circuitry referred to herein may in practice be provided by a single chip or integrated circuit or plural chips or integrated circuits, optionally provided as a chipset, an application-specific integrated circuit (ASIC), field-programmable gate array (FPGA), etc. The chip or chips may comprise circuitry (as well as possibly firmware) for embodying at least one or more of a data processor or processors, a digital signal processor or processors, baseband circuitry and radio frequency circuitry, which are configurable so as to operate in accordance with the exemplary embodiments. In this regard, the exemplary embodiments may be implemented at least in part by computer software stored in (non-transitory) memory and executable by the processor, or by hardware, or by a combination of tangibly stored software and hardware (and tangibly stored firmware).

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method of switching radio access technology used by a wireless device, the method comprising:
   causing the wireless device to disconnect from using a first radio access technology and to at least attempt to connect to use a second radio access technology provided by a second network that is not the same as the first network and is not recorded in the wireless device as being equivalent to the first network;
   determining by the wireless device that the wireless device should revert to using the first radio access technology; and,
   at expiry of a predetermined period of time after the determining, causing the wireless device to cease using or attempting to use the second radio access technology and to revert to using the first radio access technology by causing the wireless device to carry out a higher priority search of networks at expiry of the predetermined period of time;
   wherein the wireless device is initially connected to a first network that provides the first radio access technology and stores information concerning the first network before the wireless device disconnects from using the first radio access technology, and
   wherein the wireless device uses the stored information concerning the first network to reconnect back to the first network at expiry of the predetermined period of time.

2. A method of switching radio access technology used by a wireless device, the method comprising:
   causing the wireless device to disconnect from using a first radio access technology and to at least attempt to connect to use a second radio access technology, wherein one of the first and second radio access technologies is LTE network technology;
   causing the wireless device to determine that the wireless device should revert to using the first radio access technology; and,
   at expiry of a predetermined period of time after the determining, causing the wireless device to cease using or attempting to use the second radio access technology and to revert to using the first radio access technology by reselecting a cell that uses the first radio access technology at expiry of the predetermined period of time;
   wherein the wireless device is initially connected to a first network that provides the first radio access technology and stores information concerning the first network before the wireless device disconnects from using the first radio access technology,
   wherein the wireless device uses the stored information concerning the first network to reconnect back to the first network at expiry of the predetermined period of time, and
   wherein the second radio access technology is provided by the same first network or by a network that is recorded in the wireless device as being equivalent to the first network.

3. A method according to claim 2, wherein the information concerning the first network is stored in a memory of the wireless device.

4. A method according to claim 1, wherein the first and second networks providing the respective first and second radio access technologies is a public land mobile network, the first radio access technology uses LTE network technology, and the second radio access technology provides circuit switched services.

5. Apparatus for a wireless device, the apparatus comprising:
- at least one processor;
- and at least one memory including computer program code;
- the at least one memory and the computer program code being configured to, with the at least one processor, cause the apparatus at least to:
- cause the wireless device to disconnect from using a first radio access technology and to at least attempt to connect to use a second radio access technology provided by a second network that is not the same as a first network and is not recorded in the wireless device as being equivalent to the first network;
- cause the wireless device to determine that the wireless device should revert to using the first radio access technology; and,
- at expiry of a predetermined period of time after the determining, cause the wireless device to cease using or attempting to use the second radio access technology and to revert to using the first radio access technology by carrying out a higher priority search of networks at expiry of the predetermined period of time;
- wherein the at least one memory and the computer program code are configured, with the at least one processor, such that the wireless device is initially connected to the first network that provides the first radio access technology and the wireless device stores in a memory information concerning the first network before the wireless device disconnects from using the first radio access technology, and uses the stored information concerning the first network to reconnect back to the first network at expiry of the predetermined period of time.

6. Apparatus for a wireless device, the apparatus comprising:
- at least one processor;
- and at least one memory including computer program code;
- the at least one memory and the computer program code being configured to, with the at least one processor, cause the apparatus at least to:
- cause the wireless device to disconnect from using a first radio access technology and to at least attempt to connect to use a second radio access technology, wherein one of the first and second radio access technologies is LTE network technology;
- determine by the wireless device that the wireless device should revert to using the first radio access technology; and,
- at expiry of a predetermined period of time after the determining, cause the wireless device to cease using or attempting to use the second radio access technology and to revert to using the first radio access technology;
- wherein the at least one memory and the computer program code are configured, with the at least one processor, such that the wireless device is initially connected to a first network that provides the first radio access technology and the wireless device stores information concerning the first network before the wireless device disconnects from using the first radio access technology,
- wherein the wireless device uses the stored information concerning the first network to reconnect back to the first network at expiry of the predetermined period of time, and
- wherein the second radio access technology is provided by the same first network or by a network that is recorded in the wireless device as being equivalent to the first network and such that the wireless device reverts back to using the first radio access technology by reselecting a cell that uses the first radio access technology at expiry of the predetermined period of time.

7. Apparatus according to claim 6, wherein the at least one memory and the computer program code are configured, with the at least one processor, such that the information concerning the first network is stored in a memory of the wireless device.

8. Apparatus according to claim 5, wherein the at least one memory and the computer program code are configured, with the at least one processor, such that the wireless device is capable of using LTE network technology on a public land mobile network as the first radio access technology, and using a radio access technology that provides circuit switched services on a public land mobile network as the second radio access technology.

9. Apparatus according to claim 5, wherein the apparatus comprises one or more components of the wireless device.

10. A method according to claim 2, wherein the network or networks providing the first and second radio access technologies is a public land mobile network, the first radio access technology uses LTE network technology, and the second radio access technology provides circuit switched services.

11. Apparatus according to claim 6, wherein the at least one memory and the computer program code are configured, with the at least one processor, such that the wireless device is capable of using LTE network technology on a public land mobile network as the first radio access technology, and using a radio access technology that provides circuit switched services on a public land mobile network as the second radio access technology.

12. Apparatus according to claim 6, wherein the apparatus comprises one or more components of the wireless device.

* * * * *